(12) United States Patent
Radovich

(10) Patent No.: US 7,107,774 B2
(45) Date of Patent: Sep. 19, 2006

(54) METHOD AND APPARATUS FOR COMBINED CYCLE POWER PLANT OPERATION

(75) Inventor: Michael J. Radovich, Plainsboro, NJ (US)

(73) Assignee: Washington Group International, Inc., Boise, ID (US)

( * ) Notice: Subject to any disclaimer, the term of this patent is extended or adjusted under 35 U.S.C. 154(b) by 118 days.

(21) Appl. No.: 10/870,006

(22) Filed: Jun. 17, 2004

(65) Prior Publication Data

US 2005/0034445 A1 Feb. 17, 2005

Related U.S. Application Data

(60) Provisional application No. 60/494,517, filed on Aug. 12, 2003.

(51) Int. Cl.
*F02C 6/00* (2006.01)
*F02C 7/26* (2006.01)

(52) U.S. Cl. .................. 60/778; 60/39.182; 60/787; 60/39.21; 122/7 B

(58) Field of Classification Search ............ 60/39.182, 60/39.5, 787, 39.21, 778; 122/7 R, 7 B
See application file for complete search history.

(56) References Cited

U.S. PATENT DOCUMENTS 4,125,996 A * 11/1978 Schmoch ................ 60/39.182
4,437,313 A 3/1984 Taber et al.
4,576,124 A 3/1986 Martens et al.
4,875,436 A * 10/1989 Smith et al. ............. 60/39.182
5,029,443 A 7/1991 Hauser
5,412,936 A 5/1995 Lee et al.
5,473,898 A 12/1995 Briesch
5,737,911 A * 4/1998 Hoizumi et al. ......... 60/39.182
6,945,052 B1 * 9/2005 Frutschi et al. ......... 60/39.182

FOREIGN PATENT DOCUMENTS

WO    WO03/029618    *    4/2003

* cited by examiner

*Primary Examiner*—Ted Kim
(74) *Attorney, Agent, or Firm*—David Silverstein; Andover-IP-Law

(57) ABSTRACT

Methods and apparatus are disclosed for starting up a combined cycle plant using a startup duct to connect an auxiliary engine to the inlet of a plurality of HRSGs or other heat recovery systems. Each HRSG is fed by a combustion turbine. Dampers are supplied to isolate each HRSG from the startup duct and its CTG. The auxiliary engine is also ported to a stack allowing simple cycle operation. Dampers are also supplied to isolate the auxiliary engine from the startup duct and from its stack. During startups, the large CTGs will be isolated and the auxiliary engine will be connected to the HRSGs and started, allowing the HRSG to pressurize. As each HRSG pressurizes, it is isolated from the startup duct and connected to its respective CTG. The CTG is then started and loaded. The auxiliary engine is turned off and isolated when the last HRSG pressurizes.

28 Claims, 2 Drawing Sheets

METHOD AND APPARATUS FOR COMBINED CYCLE POWER PLANT OPERATION

This application claims the benefit of U.S. Provisional Application(s) No(s).: 60/494,517 Aug. 12, 2003

FIELD OF THE INVENTION

This invention relates generally to power plants and more particularly to methods and apparatus for controlling the operation of a combined cycle power plant during startup and part-load operations so as to minimize emissions, fuel consumption, thermal stresses and startup or load change duration and to realize other capital cost and operational savings.

BACKGROUND OF THE INVENTION

Until recently, most combined cycle power plants were optimized solely for base load conditions. Little thought was paid to start-up operations because it was expected that, during the early years of a power plant's life, the combined cycle plant would be operated continuously because it was more efficient than older power plants.

Because start-up operation under this assumption was a small percentage of overall plant operation, inefficiencies, emissions, fuel consumption, thermal stresses, and other aspects of start-up and reduced-load operations were not considered significant in the overall picture. A conventional combined cycle power plant is generally started up using the following procedures:

First, a Combustion Turbine Generator (CTG) is started, accelerated to firing temperature, fired, accelerated to synchronous speed, synchronized, and then brought to a minimum load. In practice, a CTG control system automatically controls this sequence. Once minimum load is achieved, the operator can increase CTG load. Generally, the operator would prefer to minimize CTG load at the beginning of the startup to reduce the amount of heat that needs to be rejected by a Heat Recovery Steam Generator (HRSG). However, sometimes, the CTG is restricted from operating at low loads for extended periods of time because of mechanical restrictions or the desire to reduce air emissions, which are usually much higher at low loads.

Before the CTG can be fired, it must be purged to remove potential fuel vapor collecting in the CTG and HRSG after the unit is shut down. Purging is usually accomplished by accelerating the CTG to part speed and holding at part speed until a specified number of air changes occur in the HRSG and CTG. As there is much more volume in an HRSG than a CTG, a "simple cycle" CTG (without an HRSG) only requires purging for several minutes, while a CTG with HRSG requires purging for up to half an hour.

While purging, significant auxiliary energy is used to crank the CTG. In addition, the exhaust leaving the CTG is close to ambient temperatures. If this purge exhaust enters a hot HRSG, it will cool off the HRSG. Steam can actually condense in the superheater section (the part of the HRSG that increases steam temperature), causing stress in the superheaters. Any condensate produced in the superheater must be drained to prevent slugs of condensate being pushed into the steam pipes.

The hot exhaust leaving the CTG during this sequence passes through the HRSG, where it heats up the water in the HRSG and raises pressure in the steam drums. When steam pressure is slightly above atmospheric pressure, the rate of the heat-up can be controlled by venting steam from the drums and at the outlet of the HRSG. To minimize thermal stress on the high pressure (HP) drum, HRSG vendors typically prefer to limit the heat-up rate of this drum's shell to about 200° F. per hour. However, this rate is usually exceeded before venting occurs.

CTGs are constant flow machines—once they reach design speeds, the exhaust mass flow is fixed within narrow limits. Because a significant amount of energy is used to drive the compressor, a significant amount of heat is generated even at idle conditions. At idle conditions, a modern, large CTG releases approximately one third of the heat at idle conditions as it does at fill load. Thus, when starting up, CTGs generally produce much more heat than is needed.

When sufficient pressure has been raised in the HP drum, steam seals around the Steam Turbine Generator (STG) are set, and a vacuum is pulled using a steam jet air ejector (SJAE) or a mechanical vacuum pump. If a SJAE is used, sometimes the operator will take additional time to raise sufficient steam pressure to operate the SJAE. Once a partial vacuum is established, steam generated in the HRSG can be dumped into the condenser. A vacuum is also a prerequisite to starting the STG.

As pressure rises, the operator introduces steam to the main header connecting the HRSG to the STG. These pipes initially heat up rapidly because the steam condenses on the inside surfaces of these pipes. However, once the condensation stops, the pipes heat up much more slowly. Depending on the venting capacity of the throttle line, it can take thirty to sixty minutes to heat the line to the temperatures required to open the throttle valve and allow the STG to roll off turning gear.

Generally, before the STG can be rolled off, water chemistry in the HRSG steam drum has to be controlled to specified limits. This is achieved by flushing water through the drum until the desired chemistry is established. This is generally required by the time the drum pressure reaches 1000 psig, which can take thirty to sixty minutes.

The term "heat soak" as used in connection with this application is meant to refer to the process of gradually increasing the temperature of the steel in the HRSG and STG to minimize thermal stresses that can cause fatigue damage to the equipment. Heat is also applied to the inside surfaces of the shell of the steam turbine and the drum of the HRSG. If the temperature of the inside surface of the metal is significantly higher than that of the outside surface of the metal, the inside metal surface thermally expands more than the outside surface of the metal thereby placing the outside metal surface in tension, which can damage the metal. By gradually raising the interior temperature, however, heat has time to "soak" through the entire metal thickness thereby reducing stress.

Heat soaking is also used to reduce the temperature differential between the shell of the STG and the rotating rotor in the STG. To increase STG efficiency, the rotating parts of a STG are assembled very close to the stationary parts. If the rotating portions of the STG heat up faster than the stationary portions, the rotating portions will expand more and eventually rub against the stationary portions. Lastly, in some high temperature steam turbines, the steel has to change phase to become a more ductile form of steel that can resist the high stresses imposed at full load operation. This phase change also requires some time to occur.

Once the steam turbine rolls off turning gear, the startup sequence of the steam turbine is usually the critical path for plant startup. The steam turbine generally must be gradually started up and held at various speeds and loads to heat soak.

Throttle and reheat steam temperature must also be regulated during this sequence. The steam turbine needs only limited amounts of steam while this is occurring, so any surplus steam must be vented to the atmosphere or dumped to the condenser. CTG loads are adjusted at this time to limit steam temperature and to minimize the amount of steam dumped to the condenser or the atmosphere.

Unfortunately, the CTG load level that will produce the desired steam temperature or flow will sometimes also result in extremely high levels of emissions. In most modern, large, combined cycle plants, Selective Catalytic Reduction (SCR) and CO (carbon monoxide) oxidation catalysts are used to control emissions. The SCR catalyst promotes reaction of ammonia with NOx compounds to produce nitrogen and water. The CO catalyst promotes oxidation to destroy CO and volatile organic carbons (VOCs). These catalysts are usually located downstream of the high-pressure evaporator. Because an evaporator is extremely effective in removing heat from the exhaust gas, the temperature of the flue gas leaving the evaporator section is normally only about 15° F. above the saturated steam temperature in the HP drum, and catalyst temperatures are effectively controlled by controlling drum pressure. These catalysts generally require a flue gas temperature of approximately 500° F. to destroy appreciable proportions of the pollutants present; thus, the HP drum pressure must reach approximately 600 psia before they will operate effectively. The SCR can sometimes require additional contact time because the aqueous ammonia consumed by the SCR must be vaporized in a packing tower which can require heat soaking time.

Additionally, thermal stresses during startups can cause significant damage to combined cycle plants. Metal fatigue is concentrated in two areas: in the metal in the drum of the high pressure evaporator and in the shell and blades of the high pressure section of the steam turbine. Because the high pressure steam drum operates at high pressures and temperatures and needs a large diameter, it has a thick shell. If the drum heats up quickly, the inside of the drum will become much hotter than the perimeter. This sets up thermal stresses that, over time, can cause the drum to fail in fatigue. A large steam turbine can encounter even higher stresses because it operates at almost the same pressure as the steam drum and at much higher temperatures. Modern reheat steam turbines commonly reach metal temperatures of about 1000° F. As the blades in the front end of the steam turbine approach this temperature, the metal of which they are constructed undergoes a phase change. The steam turbine cannot be heavily loaded until this change occurs, and this in turn requires that the steam turbine be carefully loaded and/or heat soaked.

Because of all of these constraints, starting up a modern combined cycle plant can require a significant amount of time and expense. For example, a typical, recently constructed 750 megawatt (MW) combined cycle plant required three to ten hours to start up. Start up costs, net of power sales, typically range from $25,000 to $80,000 per startup. In modern operating practice, combined cycle plants are started and stopped much more frequently than in the past.

When power plant operation was controlled by utilities, plant starts were carefully apportioned among the plants owned by a utility to avoid wearing out individual plants. Today, however, plants are essentially controlled by futures traders; when the cost of electricity is high, power traders want the plant to start as quickly as possible. When the cost is low, power traders want to shut down the plants immediately. Thus, plants can be required to start up daily and must be designed to withstand thermal stresses caused by these frequent startups over the typical twenty-year life of the plant. With deregulation, sales prices for electricity can vary significantly from hour to hour while fuel costs are generally constant over such a relatively short time period. Starting during off-peak periods is expensive because the revenue earned when the electricity is sold at a low price may not recoup the fuel cost. On the other hand, starting during on-peak periods takes time, which reduces the revenue earned during on-peak operation.

Another consideration of growing importance is emissions during startup. Regulators have recently become aware of the high amounts of pollutants emitted during startup. A typical large CTG, such as the Westinghouse 501F, emits several pounds per hour of CO during steady-state operations, but over 500 pounds of CO during each startup. Regulators are beginning to require operators to account for these emissions by buying offsets (i.e., transferring permission to pollute from one operator to another). This is often difficult and expensive to do as these offsets can be in short supply. In addition, regulators are beginning to impose restrictions on startup emissions. To reduce these emissions, the HP drum should be maintained at 600 psig or higher to allow the catalysts to function effectively. None of the prior art combined cycle systems is effective in controlling emissions, in part because of the failure to operate at optimum conditions during startup.

The prior art in this field discloses numerous techniques for reducing startup durations and costs. One previous method of controlling steam production during startup, for example, was to install a startup damper between the CTG and the Heat Recovery Steam Generator (HRSG). Such a startup damper was intended to vent a portion of the CTG exhaust so that the HRSG only produced the amount of steam needed to start up the Steam Turbine Generator (STG). Such plants, and the general control system therefor, are described in Taber et. al., U.S. Pat. No. 4,437,313, which is incorporated herein by reference.

This technique is not commonly used in recently designed combined cycle plants, however, because recent environmental regulations generally prohibit discharging CTG exhaust to the atmosphere without passing it through SCR and oxidation catalyst treatment steps. If a bypass stack is used, it would also have to be equipped with SCR and CO catalysts, which would further increase costs. In addition, the SCR treatment step takes enough time to operate that the bypass operation would likely be finished before the SCR was operational.

Combined cycle plants commonly incorporate auxilary boilers. The steam in the boiler is used to set the steam seal around the steam turbine, retaining the condenser vacuum after the plant is shut down. Steam from this boiler can also be injected into the HP drum to maintain pressure in the drum. Because the HP evaporator tubes are such efficient radiators of heat, it is difficult to maintain drum pressure much above 15 psig, even if the outlet stack is provided with a damper to retain heat. The prior art in this field recognizes several techniques for introducing heat to an HRSG, for example as taught in Kuribayashi et al., U.S. Pat. No. 4,282,708, which is incorporated herein by reference.

Several other patents describe methods of warning steam turbines during startup, such as U.S. Pat. No. 5,473,898 (Briesch). U.S. Pat. No. 5,412,936 (Lee et al.) describes a method of modulating steam temperature to the STG. U.S. Pat. No. 4,576,124 (Martens et al.) describes a method of startup using a trailing HRSG. U.S. Pat. No. 5,029,443 describes a method of starting up a power plant using a start-up gas turbine and startup HRSG to produce steam and electricity to start the plant. This patent does not rout exhaust gas from the start-up gas turbine to the HRSGs of the other plants, so it has the disadvantages of a plant with an auxiliary boiler. Each of the foregoing patents is incorporated herein by reference.

Some previous combined cycle plants have manifolded their CTG exhausts together allowing exhaust to flow from one HRSG or another. An example of this art was the AES Placerita plant located in California. This plant utilized two identical CTGs feeding a common duct to feed two HRSGs. One HRSG was designed for power generation while the other was designed to produce steam to increase oilfield production. Four isolation dampers were utilized to isolate each CTG and HRSG from the common duct. This design, however, has the disadvantages that the cross-over duct cannot be isolated, that a small CTG is not available for startups, and that the cross-over duct (being large enough to pass the entire flow of a large CTG) imposes a large pressure drop penalty compared to a small duct required for heat-up only.

Lastly, several prior art combined cycle plants have used fresh-air firing configurations. Forced-draft fresh-air firing utilizes an isolation damper or slide gate capable of isolating the CTG from the HRSG; an external fan capable of blowing combustion air into the inlet of the HRSG; another isolation damper or slide gate capable of isolating the fan from the inlet of the HRSG; and a burner located within the HRSG or between the fan and the fan isolation valve.

During normal operation of a forced-draft fresh-air fired HRSG, the CTG supplies hot exhaust to the HRSG; the CTG damper is open; the fan damper is closed; and the fan is off. During fresh-air firing, the CTG is off, the fan and burner are on, the CTG damper is closed, and the fan damper is open. Fresh-air firing HRSGs are designed so that the fresh-air system operates when the CTG is unavailable, or occasionally, when the CTG goes out of service.

Another, more unusual, form of fresh-air firing is known as induced draft fresh-air firing. This variant utilizes a slide gate or damper isolating the CTG from the inlet of the HRSG; an inlet damper capable of drawing fresh air directly into the inlet of HRSG; an internal duct-burner; and an induced draft fan located between the HRSG and its stack, capable of drawing the entire flow of the HRSG into the stack.

During normal operation of this configuration, the CTG and induced draft fan are in operation, the CTG duct is open and the fresh air duct closed, and the duct-burner is off or operating at part load. When the CTG goes out of service, the fresh air damper opens, the CTG duct closes, and the burner firing rate increases to maintain HRSG steam production. This configuration is usually only installed when the steam supply from the HRSG must not be interrupted, even if the CTG trips.

Both of the above-described fresh-air firing configurations are designed to supply steam from the HRSG in the event that the CTG trips, the CTG is unavailable, or it is uneconomic to operate the CTG. It appears from available literature and commercial knowledge that no fresh-air firing systems have ever been designed or used to help start-up a combined cycle system. A fresh-air fired system designed to start up a combined cycle system would almost certainly have to be designed differently. At a minimum, it would have a smaller fan and burner because full flow and heat release is not desired during startup.

It has now been found, however, that methods and apparatus according to this invention for controlling the operation of a combined cycle power plant during startup and part-load operations overcome the above-described limitations and disadvantages of conventional operation in whole or at least in part.

OBJECTS OF THE INVENTION

Accordingly, a general object of this invention is to provide improved apparatus and methods for controlling the operation of a combined cycle power plant during start up and part-load operations.

A principal object of this invention is to provide a combined cycle system and method wherein replacement hot flue gas is added before and after normal operation to assist in effecting startup, and, optionally, also during normal CTG operation.

A specific objective of this invention is to provide a combined cycle power plant system designed to minimize thermal stress in the high pressure drum of the HRSG during startups by keeping the drum pressurized during shutdowns.

Another specific objective of this invention is to provide a combined cycle power plant system designed to minimize the time required to establish proper water chemistry in the HRSG by keeping the drum pressurized during shutdown.

Still another specific objective of this invention is to provide a combined cycle power plant system designed to minimize startup time by economically maintaining condenser vacuum, drum pressure and header temperature during shutdowns.

Yet another specific objective of this invention is to provide a combined cycle power plant system designed to minimize emissions of the plant during startup, load changes, and hot standby by maintaining proper catalyst temperatures during shutdowns.

Yet another specific objective of this invention is to provide a combined cycle power plant designed to provide additional steam production at times when heavy electrical power usage is expected, e.g., on hot days, by providing additional flow of hot exhaust gases to the HRSG.

Yet another specific objective of this invention is to provide a combined cycle power plant designed to provide more steam than could be provided by a comparably-sized CTG by providing additional exhaust flow to the HRSG to support additional duct-burning.

Yet another specific objective of this invention is to provide a combined cycle power plant designed to provide a reliable steam supply from the HRSG when the CTG is unavailable.

Further objects and advantages of this invention will become apparent from the following detailed description of the invention, which is to be read in conjunction with the accompanying drawings.

SUMMARY OF THE INVENTION

A combined cycle power plant system designed and operated in accordance with this invention reduces startup emissions, thermal stress, fuel consumption and duration by modifying the design of a conventional combined cycle power plant in certain novel and unobvious ways. Methods and apparatus according to this invention comprise one or more of the following key elements:

(a) a hot gas generator, for example an auxiliary gas turbine, other auxiliary engine, burner, or other type of hot gas source, connected by an HRSG inlet ductwork system to the inlet of each HRSG;

(b) an HRSG damper system or other fluid flow control system within the HRSG inlet ductwork system that allows each HRSG to be selectively isolated from the associated HRSG inlet ductwork and provides a path or outlet for the auxiliary gas turbine or other auxiliary engine to vent to the atmosphere instead of feeding to the HRSG; and, (c) a control system which allows all of these elements to operate cooperatively during plant startups, shutdowns, and load reduction periods.

Figure 1:
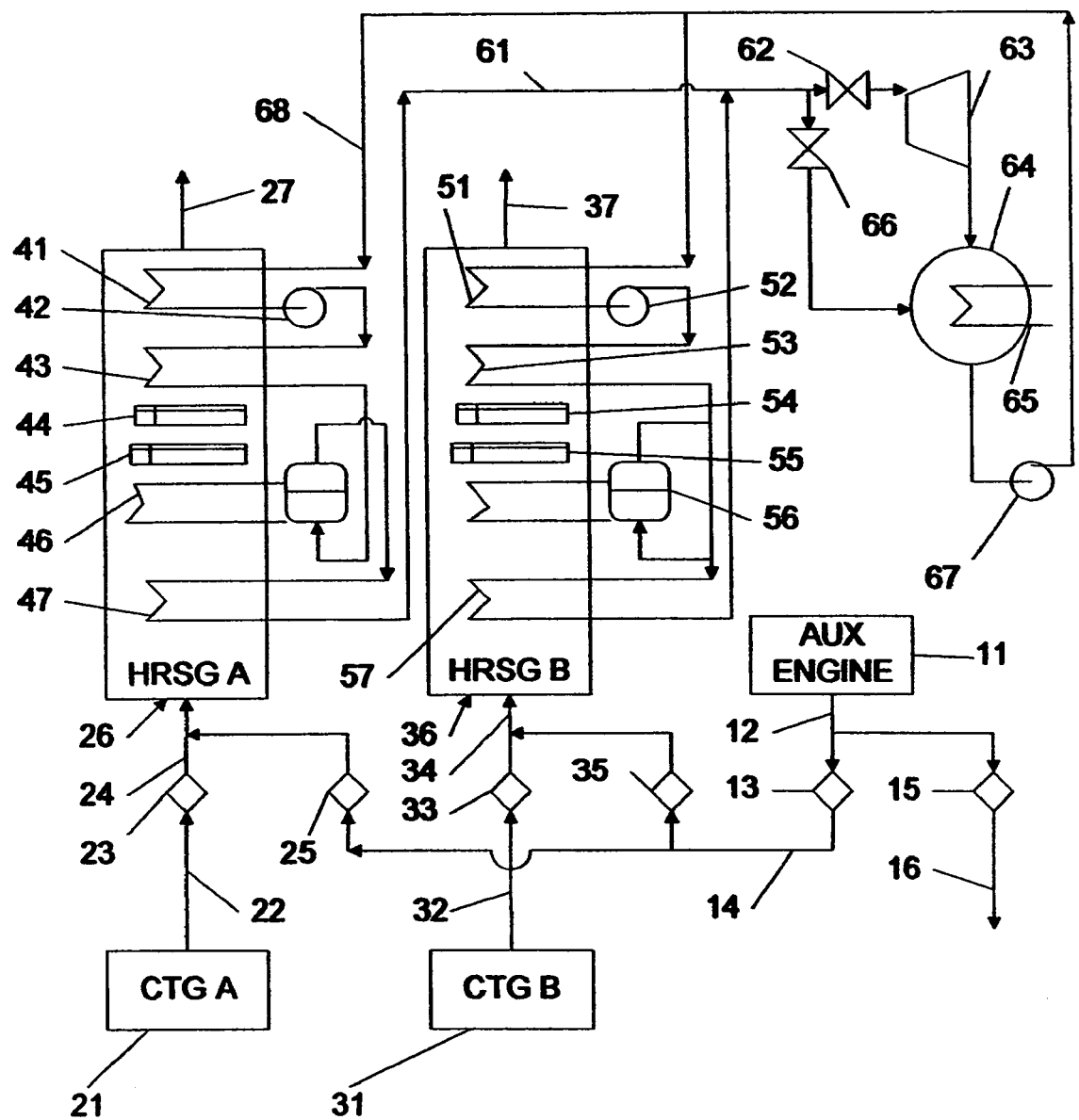
FIG. 1 is a process flow diagram schematically illustrating a preferred embodiment of methods and apparatus according to the present invention wherein duct damper systems are shown as diamonds.

Below is a summary of the reference numerals used in FIGS. 1 and 2:

DRAWINGS-REFERENCE NUMERALS

11 Hot gas generator (e.g., auxiliary engine or burner)
12 Auxiliary engine (hot gas generator) exhaust duct
13 Auxiliary engine (hot gas generator) startup damper or flow control element
14 Startup duct
15 Auxiliary engine (hot gas generator) stack or vent damper or flow control element
16 Auxiliary engine (hot gas generator) stack or vent
21 Combustion Turbine Generator (CTG) A
22 CTG A exhaust duct
23 CTG A isolation damper or flow control element
24 Heat Recovery Steam Generator (HRSG) A diffuser
25 HRSG A startup damper or flow control element
26 HRSG A
27 HRSG A stack or vent
31 CTG B
32 CTG B exhaust duct
33 CTG B isolation damper or flow control element
34 HRSG B diffuser
35 HRSG B startup damper or flow control element
36 HRSG B
37 HRSG B stack or vent
41 Preheater A
42 Feedwater Pump A
43 Economizer A
44 SCR (Selective Catalytic Reduction) catalyst A
45 CO (Carbon Monoxide Oxidation) catalyst A
46 Evaporator A
47 Superheater A
51 Preheater B
52 Feedwater Pump B
53 Economizer B
54 SCR catalyst B
55 CO catalyst B
56 Evaporator B
57 Superheater B
61 Main steam header
62 Throttle Valve
63 Steam Turbine Generator (STG)
64 Condenser
65 Circulating water system
66 Dump Valve
67 Condensate Pump
68 Condensate Header
70 Distributed Control System (DCS)
71 HRSG A steam temperature gauge
72 HRSG B steam temperature gauge
73 CTG A isolation damper actuator
74 HRSG A startup damper actuator
75 CTG B isolation damper actuator
76 HRSG B startup damper actuator
77 Auxiliary engine (hot gas generator) startup damper actuator
78 Auxiliary engine (hot gas generator) stack damper actuator
79 CTG A isolation damper position indicator
80 HRSG A startup damper position indicator
81 CTG B isolation damper position indicator
82 HRSG B startup damper position indicator
83 Auxiliary engine (hot gas generator) startup damper position indicator
84 Auxiliary engine (hot gas generator) stack damper position indicator

DETAILED DESCRIPTION OF PREFERRED EMBODIMENTS

A. A Representative System

A preferred embodiment of the system of this invention is schematically illustrated in FIG. 1. In this embodiment, two CTG/HRSG trains are shown, identified respectively as trains A and B, although it will also be understood that this invention can readily be adapted to work with one, three or more such trains. For simplicity, the preferred embodiment shows a single pressure HRSG, a non-extraction-type STG, and a deaerating condenser, although more complex power plant designs can also be adapted to utilize this invention in a manner that will be appreciated by one skilled in this art. In an alternative embodiment, the HRSG can be replaced by another type of heat recovery system.

Hot gas generator or source unit 11 can be an auxiliary engine or burner, or a small gas turbine, or a diesel generator. In accordance with preferred embodiments of this invention, hot gas source unit 11 is sized so as to be capable of generating only a limited amount of heat primarily in the form of hot gas exhaust, which limited amount of heat is substantially less, for example on the order of about 1%–15%, preferably less than about 10%, relative to the amount of heat primarily in the form of hot gas produced under normal operating conditions by the combustion turbine unit. In a preferred embodiment of the invention, hot gas source unit 11 is sized, adapted and/or operated so as to meet specific design objectives, including a specific startup sequence.

For example, if the embodiment is intended only to provide enough heat to maintain HP drum pressure, the hot gas generator will be sized to produce approximately one percent of all the heat released by all the CTGs operating at full load. If the embodiment is designed to provide enough heat to maintain HP drum pressure, enough heat to seal steam on the STG, and/or enough heat/steam to operate the SJAE (steam jet air ejector) that maintains condenser vacuum, the hot gas generator will be sized somewhat larger, for example to produce approximately two percent of the CTG heat release. Maintaining HP drum pressure, seals, condenser vacuum and heat for heat soaking the STG will require a hot gas generator capable of producing approximately five percent of the CTG heat release. To produce enough steam for the items mentioned above, plus heat required for keeping the STG synchronized at minimum load would typically require a hot gas generator sized to produce approximately ten to fifteen percent of the CTG heat release.

An existing gas turbine or diesel generator may be required by a plant in accordance with this invention to provide sufficient electrical power during shutdowns or to start up the plant, and this engine can also provide heat needed for startups. Alternatively, auxiliary engine or burner 11 can be sized to supply electrical power for an ice-building system, supply steam for an off-site customer, or supply sufficient steam to keep the steam turbine on line. All of such variations in the embodiment illustrated in FIG. 1 are considered to be within the scope of this invention.

As shown in FIG. 1, the exhaust port of auxiliary engine or burner 11 is ported to an auxiliary engine exhaust duct 12, which is connected to both an auxiliary engine first fluid flow control device, such as startup damper 13, and to an auxiliary engine second fluid flow control device, such as stack damper 15. The auxiliary engine exhaust duct 12 may be selected from conventional heavy-duty insulated exhaust duct of a type normally used in power plants to convey hot exhaust gases. The auxiliary engine startup damper 13 and auxiliary engine stack damper 15 may be selected from conventional heavy-duty dampers normally used in combined cycle power plants. Guillotine, spectacle, louver, sickle, butterfly, or flap-type dampers could be utilized for damper elements 13 and 15. Each damper system would include a damper element and could also include common appurtenances, such as expansion joints, transition pieces and silencers. Alternatively, a single diverter damper, such as a flapper could be utilized to divert flow to either a startup duct 14 or to an auxiliary engine stack 16. Such a diverter damper assembly could be used to replace both the auxiliary engine startup damper 13 and the auxiliary engine stack damper 15.

The startup duct 14 connects the auxiliary engine startup damper 13 with a HRSG A startup damper 25 and with a HRSG B startup damper 35. The startup duct 14 may be selected from conventional heavy-duty insulated exhaust ducts, of a type normally used in power plants to convey hot exhaust gases, and sized to allow the full exhaust of the auxiliary engine or burner 11 to pass through with minimal pressure drop.

A Combustion Turbine Generator (CTG A) exhaust duct 22 connects a CTG A (reference numeral 21) to a CTG A isolation damper 23. The CTG A 21 may be a conventional CTG used to produce plant power during normal plant operation. An example of a suitable CTG for this purpose would be a Siemens-Westinghouse 501F gas turbine. The CTG A exhaust duct 22 may be selected from conventional heavy-duty insulated exhaust ducts, of a type normally used in power plants to convey hot exhaust gases. CTG B (reference numeral 31), CTG B exhaust duct 32, and CTG B isolation damper 33 are connected and designed in a similar way to corresponding reference numbers 21, 22, and 23, as discussed above.

HRSG (Heat Recovery Steam Generator) A (reference numeral 26) is typically comprised of a HRSG A diffuser 24, Superheater A 47, Evaporator A 46, CO (Carbon Monoxide) oxidation catalyst A 45, Selective Catalytic Reduction (SCR) catalyst A 44, economizer A 43, Feedwater pump A 42, Preheater A 41 and HRSG A stack 27. Each of these individual elements is conventional in the power plant art and is commonly supplied by HRSG or boiler feed pump vendors.

As seen in FIG. 1, components 23, 24, 25 and 47 are juxtaposed relative to one another such that HRSG A diffuser 24 connects the CTG A isolation damper 23, HRSG A startup damper 25 and Superheater A 47. HRSG A diffuser 24 is designed to gradually decelerate exhaust gas as it leaves CTG A (reference numeral 21) so that portions of it enter all sections of Superheater A 47 with substantially similar velocities. The CTG A isolation damper 23 and HRSG A isolation damper 25 may be selected from conventional heavy-duty dampers normally used in combined cycle power plants. Guillotine, spectacle, louver, sickle, butterfly, or flap-type dampers could be utilized here as the damper element. Each damper system would normally comprise a damper element and would typically also include appurtenances such as expansion joints, transition pieces and silencers. Alternatively, a single diverter damper, such as a flapper, could be utilized to allow flow to enter HRSG A (reference numeral 26) from either the startup duct 14 or from the CTG A exhaust duct 22. Such a diverter damper assembly could be used to replace both the CTG A isolation damper 23 and HRSG startup damper 25. CTG B isolation damper 33, HRSG B diffuser 34, and HRSG B startup isolation damper 35 are connected and designed in a similar way to corresponding reference materials 23, 24, and 25, as discussed above.

Superheater A 47 typically contains a plurality of tubes suitable for containing pressurized steam while it is being heated by the flue gas. The flue gas for this purpose is typically contained in an insulated casing surrounding the superheater tubes. Evaporator A 46 typically contains a plurality of tubes suitable for containing pressurized water while it is evaporated by heat from the flue gas. These tubes are enclosed by an enclosure connecting evaporator A 46 to superheater A 47 and to CO catalyst A 45, and suitable for containing flue gas passing through the section. Evaporator A 46 can either be a once-through, natural circulation or a forced circulation evaporator. The embodiment depicted in FIG. 1 shows a natural circulation evaporator and includes a drum, with a steam outlet and water inlet, where steam is separated from water. The steam outlet of the drum is attached to the steam inlet of superheater A 47, and the water supply connection of the drum is connected to the water outlet of economizer A 43.

CO catalyst A 45 typically contains a block of catalyst suitable for oxidizing CO and VOCs (volatile organic compounds) to produce $CO_2$. The catalyst is surrounded by an enclosure connecting CO catalyst A 45 to evaporator A 46 and to SCR catalyst A 44, which thus prevents flue gas passing through the catalyst from escaping to the atmosphere.

SCR catalyst A 44 contains a block of catalyst suitable for destroying NOx compounds by reacting the NOx compounds with ammonia adsorbed on the surface of the catalyst. To function, SCR catalyst A 44 requires a continuous supply of ammonia, which is injected upstream in an ammonia injection grid (not shown). The ammonia is generally supplied in the form of 19% aqueous ammonia, which typically requires a vaporizer and source of heat (not shown). The catalyst is surrounded by an enclosure connecting SCR catalyst A 44 to CO catalyst 45 and to economizer A 43, which thus prevents flue gas passing through the catalyst from escaping to the atmosphere.

Economizer A 43 typically contains a plurality of tubes suitable for containing pressized water while it is heated by the flue gas. The tubes are enclosed by an enclosure connecting economizer A 43 to SCR catalyst A 44 and to preheater A 41, and suitable for containing flue gas passing through this section. The water inlet to economizer A 43 is connected to the outlet of Feedwater pump A 42. Feedwater pump A 42 receives water from the outlet of Preheater A 41 and pumps it to the pressure required to pass the steam produced in the HRSG through the steam turbine.

Preheater A 41 typically contains a plurality of tubes suitable for containing pressurized water while it is heated by the flue gas. The tubes are enclosed by an enclosure connecting preheater A 41 to economizer A 43 and to HRSG A stack 27 and suitable for containing flue gas passing through this section. The water inlet to preheater A 41 is connected to condensate header 68. HRSG A stack 27 discharges to the atmosphere.

HRSG B (reference numeral 36) is comprised of a HRSG B diffuser 34, Superheater B 57, Evaporator B 56, CO oxidation catalyst B 55, SCR catalyst B 54, economizer B 53, Feedwater pump B 52, Preheater B 51 and HRSG B stack 37. The components of HRSG B (reference numeral 36) are connected and designed in a similar way to the corresponding elements in HRSG A (reference numeral 26).

Main steam header 61 connects the combined outlets of superheater A 47 and superheater B 57 to the throttle valve 62. The Steam Turbine Generator (STG) 63 is connected to the outlet of the throttle valve 62 and to the hood of the condenser 64. STG 63 is designed to extract energy from the steam.

Condenser 64 is designed to condense steam exhausting from STG 63 or dump valve 66. It typically contains a plurality of tubes containing cold water supplied by the circulating water system 65. A vessel designed to maintain the vacuum in the condenser encloses the tubes. Steam is condensed on the outsides of these tubes at subatmospheric pressures. Condenser 64 is connected to pipes leaving the dump valve 66 and to pipes entering the condensate pump 67. The condensate header 68 connects the condensate pump 67 to Preheater A 41 and to Preheater B 51. Components 61 through 68 are conventional elements in the power plant art and are available comercially.

Figure 2:
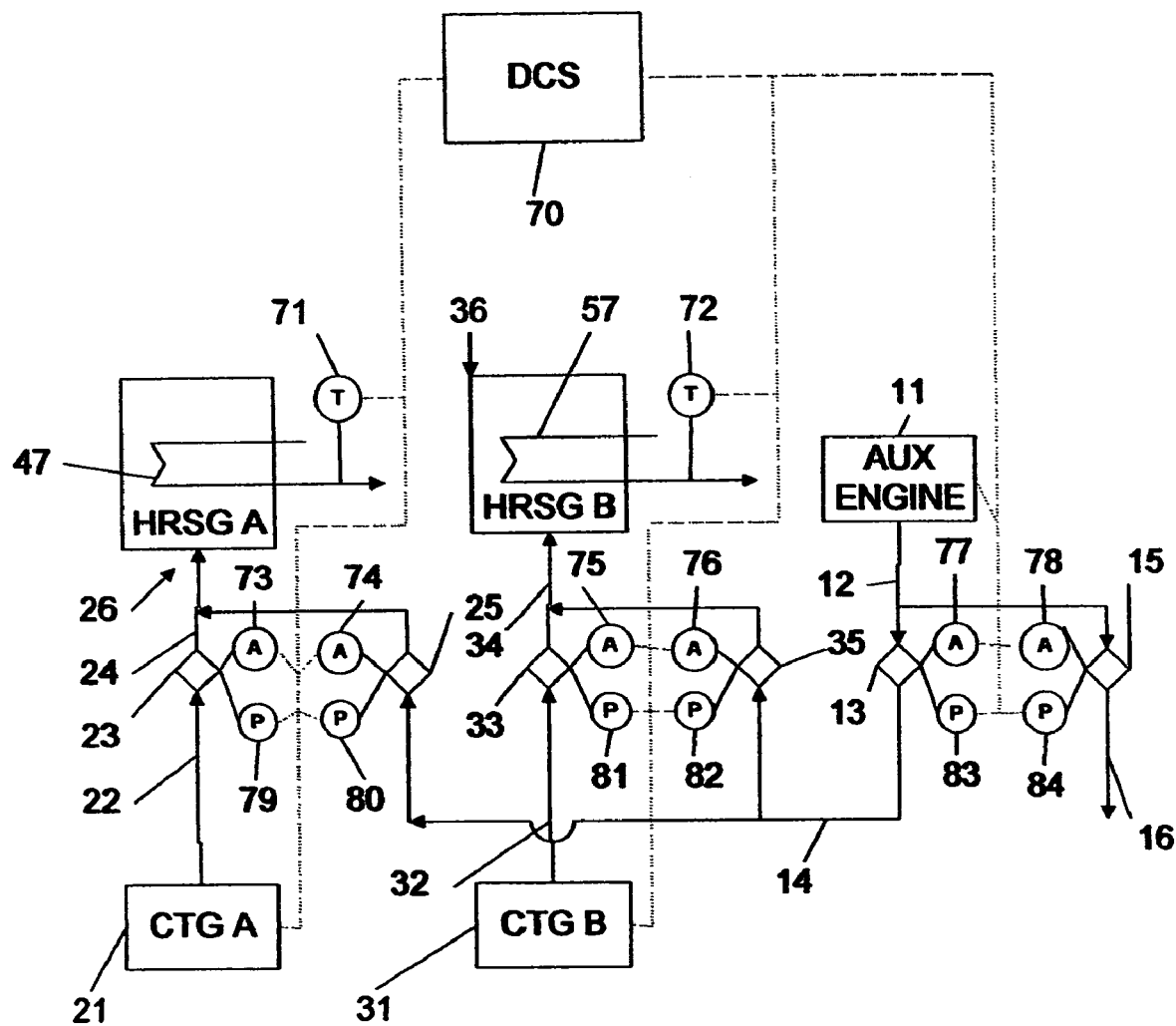
FIG. 2 is a schematic illustration of a control system, which can be used for controlling the operation of the startup duct/damper system in accordance with this invention. Damper actuators are shown as circles containing the letter "A." Damper position switches are shown as circles containing the letter "P." Temperature gauges are shown as circles containing the letter "T." Control connections, through an Ethernet or other internet or other type of connection are shown as dashed lines.

In another preferred embodiment of the invention as schematically shown in FIG. 2, a Distributed Control System (DCS) 70 will automatically control the startup sequence, although the dampers and gas turbines could be actuated manually. The position of each damper will be tracked with a position indicator, such as indicator elements 79 through 84, each typically composed of two position switches. The first switch actuates when the damper is fully closed; and, the second position switch actuates when the damper is fully open. Signals conveying information about the status of these position switches are sent to the DCS to provide feedback for control purposes.

Each damper is opened and closed by an actuator, such as actuator elements 73 through 78, controlled by DCS 70. Such actuators can be hydraulically, pneumatically or electrically controlled, and are commercially available.

Based on internal control logic, the control system "latches" a damper or CTG, thereby allowing it to operate, when all of the prerequisites for damper or CTG operation are met. The term "latching" in connection with this invention is meant to refer to the control system generating an output signal when one or more specific input signals are received. This output signal serves as a permissive, allowing an individual piece of equipment to be manually or automatically started. As an example, during startup of a complete combined cycle plant, the control system must receive signals from closed position switches on dampers 15, 23, and 33, and signals from open position switches on 13, 25, and 35 before "latching" the auxiliary engine or burner 11 allowing it to operate.

Several inputs from the CTGs can also be used for such system control operations. For example, CTG shutdown can be signaled to the control system using the CTG speed signal. Similarly, CTG startup can be signaled to the control system using the generator breaker closed signal.

Operators can monitor signals from temperature measurement devices, such as thermocouples, as guidance during startup, shutdown, and other load transition operations. The STG control system can use inputs from thermocouples in the STG to control the ramp-up rate of the STG. The CTG control can also use temperature inputs during its startup and shutdown.

In a preferred embodiment, during startup the DCS 70 will modulate the exhaust flow and temperature of the auxiliary engine or burner 11 while CTGA 21 or CTG B 22 is being purged to maintain the temperature of the gas entering the HRSG. The increased temperature and/or flow of the auxiliary engine mixes with the cold purge exhaust from the CTG that is being purged to maintain a constant or slightly lower flue gas temperature. Minimizing the drop in flue gas temperature constant minimizes the drop in steam temperature, which in turn minimizes thermal stress of the steam turbine 63. Minimizing the drop in flue gas temperature prevents condensation of steam in the superheaters, which minimizes or avoids thermal stress damage to the superheater caused by cold condensate. Because condensation does not collect in the superheaters, the superheater drains do not have to be opened, which prevents the loss of energy in the form of steam.

Startup emissions from a CTG are at a maximum when the CTG is coming up to speed. To minimize these emissions, in a preferred embodiment the DCS 70 will partially close the steam turbine throttle valve 62, thereby increasing steam drum pressure to its maximum level. This increases the catalyst temperature to its maximum, which increases the efficiency of the catalyst precisely when it is needed.

Many other variations to the control system are possible and envisioned within the scope of this invention. For instance, pressure signals from the HP drums could be used as inputs to latch the CTG connected to the HRSG. In this embodiment, CTG A or CTG B could be prevented from starting until a high pressure signal was received from the pressure gauge measuring pressure in the HP drum of the HRSG connected to the CTG. A thermocouple could monitor temperature in the startup duct. A high temperature in the startup duct when all ducts are closed would typically indicate a leaking damper. A flow meter could be added to the startup duct to measure flow through that duct.

The startup control system as described herein could also be simplified by manually starting the CTG. In most cases, no internal modification of the HRSG would be required. In some cases, however, a baffle plate may be added between the diffuser and inlet of the HRSG to equalize flow throughout the HRSG. This would prevent stratification of the gas flow through the HRSG (hot gas flowing through the top of the HRSG with stagnant or reverse flow through the bottom of the HRSG). Alternatively, tube bundles within the HRSG could be modified to tolerate stratification or other undesired flow distributions.

A redesign of the SCR may be required to allow accurate control of low volumes of ammonia during low flow conditions. The SCR system may also have to be redesigned to provide high flow rates of ammonia vapor when the CTG produces high levels of Nox when it starts. As part of the redesign of the SCR system, the CEMS (constant emission measuring system) may need to be redesigned to allow accurate measurements of pollutants during low flow conditions.

A small constant speed boiler feed pump or a large variable speed pump may be added to allow high pumping efficiencies when little steam is required. As boiler feedpumps are generally large, constant-speed machines, their energy consumption when pumping low quantities of water are almost as large as when pumping the design quantities of water. An additional advantage realized with the control systems of this invention, however, is to minimize purge time of the CTG to reduce energy consumption during startup, to reduce startup durations, and also to reduce stresses resulting from the cool purge air chilling the hot tubes in the HRSG.

B. Startup and Full Load Operation

To start the combined cycle plant of FIG. 1, dampers 13, 25, and 35 are opened and dampers 15, 23, and 33 are closed. Auxiliary engine or burner 11 is started and loaded. Exhaust gas from auxiliary engine or burner 11 travels through startup duct 14 and dampers 25 and 35 to enter HRSG 26 and HRSG 36 respectively. Exhaust gas passing through these HRSGs raise steam pressures in evaporator A 46 and evaporator B 56. After water temperatures in these evaporators heat to approximately 212° F., this water in the evaporator tubes begins to boil, and, because the evaporators contain a mixture of steam and water, saturated conditions are established and maintained.

After steam pressures are gradually raised to approximately 600 psia, proper water chemistry in evaporator A 46 and evaporator B 56 is established. As the boiling water in the evaporator tubes have very high heat coefficients, these evaporators are very effective at removing heat from the flue gas, and the flue gas leaves each evaporator at only about 10–20° F. above the saturated temperature in the drum Thus, once the saturated temperature in evaporator A 46 reaches 500° F., which occurs when saturated pressure reaches 665 psig, the flue gas leaving evaporator A 46 and entering CO catalyst A 45 and SCR catalyst A 44 is already hot enough to allow these catalysts to begin working. The catalysts in HRSG B 36 are similarly activated.

While these HRSGs are being pressurized, steam leaves the HRSGs and heats up the main steam header 61 connecting the HRSGs and the STG 63. This process is speeded up in this invention by venting some of the superheated steam through the dump valve 66, located near the throttle valve 62. Steam produced by the HRSG is also used to set steam seals around the shaft of the STG 63 and draw a vacuum in the condenser 64 using steam jet air ejectors (SJAE) (not shown).

After raising HP drum pressure in HRSG A 26, damper 25 is closed and damper 23 is opened. CTG A 21 is now started and can be quickly brought up to a load sufficient to avoid producing air emissions, and/or produce enough steam to start up the STG. Alternatively, damper 25 is kept open and damper 23 is opened. CTG A 21 is started and purged and exhaust temperature and/or flow of auxiliary engine 12 is increased to maintain the temperature of the combined exhaust from auxiliary engine 12 and CTG A 21. After raising HP drum pressure in HRSG B 36, and when additional steam is required by the STG, auxiliary engine 12 can be tripped, auxiliary engine stack damper 15 and CTG B isolation damper 33 can be opened and HRSG B startup damper 35 can be closed. CTG B 31 is then ready to be started and loaded. All CTGs and the STG are then brought to rated load following the STG vendor startup profile.

C. One Train Operation

The following description of utilizing this invention in conjunction with one-train operation is based on the assumption that CTG A 21 will continue to run at its minimum permitted load, CTG B 31 will be turned off, and the STG will continue to run. CTG B 31 is turned off, and when it has coasted down, CTG B isolation damper 33 is closed. Auxiliary engine startup damper 13 is closed, if it has not already been closed, and HRSG A startup damper 25 and HRSG B startup damper 35 are opened. CTG A 21 is ramped down to its minimum load.

A small portion of CTG exhaust gases passing through HRSG A diffuser 24 travels through the startup duct 14 into HRSG B 36, thereby maintaining drum pressure in evaporator B 56. As this HRSG remains connected to main steam header 61, evaporator B 56 maintains the same pressure. It generates a small amount of steam because the small amount of flue gas traveling through it is hotter than the tubes in the HRSG and still transfers heat to the HRSG. Thus, the water chemistry in HRSG B 36 stays good, and the catalysts continue to function effectively because they maintain their respective temperatures.

Under this mode of operation, exhaust flow through STG 63 is approximately 25% of unfired base load conditions. This is enough flow to avoid recirculation through the last stage blades of STG 63, even if rated exhaust flow is higher because the HRSG is duct-fired. If the pressure drop across STG 63 is not high enough to maintain sufficient evaporator pressure, throttle valve 62 can be throttled as needed.

D. Hot Standby Operation

The following description of utilizing this invention in conjunction with hot standby operation is based on the assumption that the plant will transition to hot standby operation from the one train operation described in the previous section (i.e., CTG A 21 at minimum load, CTG B 31 off and STG 63 at part load). However, as will be appreciated by those skilled in this art, hot standby operation can also be reached directly from base load (two train) conditions.

Auxiliary engine stack damper 15 is opened and auxiliary engine or burner 11 is started and brought to load. Auxiliary engine startup damper 13 is then opened and auxiliary engine stack damper 15 is closed, allowing hot exhaust gas from auxiliary engine or burner 11 to enter HRSG A 26 and HRSG B 36. CTG A 21 is turned off, and when it has coasted down, CTG A isolation damper 23 is closed. If the steam flow produced from the exhaust gas from auxiliary engine 15 is insufficient to keep STG 63 on line, STG 63 will be tripped.

Under this mode of operation, pressure and water chemistry is maintained in evaporator A 46 and evaporator B 56 allowing the CO catalyst A 45, SCR catalyst A 44, CO catalyst B 55 and SCR catalyst B 54 to continue to function effectively. Because steam is available for sealing, condenser vacuum will be retained. The seals around the shaft of STG 63 also help maintain the temperature of STG 63, thereby reducing the startup duration when restarting the plant. A small amount of steam is passed through dump valve 66, which assists in maintaining the temperature of main steam header 61.

Under this mode of operation, damage to the plant is minimized, because the drum temperature does not change. Keeping the drums at operating pressure reduces the specific volume of the steam generated. Thus, when the plant is restarted, CTG A 21 and CTG B 31 can be brought to load immediately, because the additional volume of steam required to be dumped to the condenser 64 does not choke the dump valve 66. As CTG A 21 and CTG B 31 immediately exhaust into the operating catalysts, startup emissions are dramatically reduced. They are reduced further because the CTGs do not have to operate at load levels that produce high levels of emissions.

E. Emergency Cool-Down Operation

If a tube leak is discovered in HRSG A 26 or HRSG B 36, the affected HRSG should be cooled as quickly as possible to allow repairs to start. If certain types of gas turbines are selected as the hot gas generator 11, this unit can be used to cool down the affected HRSG because such engines will produce exhaust at relatively low temperatures and flows, thereby allowing the HRSG to cool in a controlled fashion.

For instance, some types of aeroderivative gas turbines, such as the LM6000, can operate at low electrical loads while producing low temperatures and emissions. If an auxiliary engine is replaced with a burner, it can be turned down to produce the desired flue gas temperature.

F. Peaking Operation

The following description of utilizing this invention in conjunction with peaking operation is based on the assumption that the plant will be transitioning from base load to peaking operation. Auxiliary engine stack damper 15 is closed and auxiliary engine startup damper 13, HRSG A startup damper 25 and HRSG B startup damper 35 are opened. Auxiliary engine or burner 11 is started and loaded, which adds additional exhaust gas to HRSG A 26 and HRSG B 36 thereby producing more steam at the steam turbine.

G. Simple Cycle Operation

If the entire plant is shut down, the auxiliary engine or burner 11 can still produce power. Auxiliary engine startup damper 13 is closed and auxiliary engine stack damper 15 is opened. Auxiliary engine or burner 11 is then started and loaded, allowing this engine to produce power while the rest of the power plant is out of service. Auxiliary engine or burner 11 can also operate independently of the combined cycle plant in simple cycle mode.

H. Emergency Steam Supply

If the HRSG must supply an uninterruptable supply of steam, the auxilary engine or burner 11 can be designed to operate continuously in hot standby, producing a small amount of hot exhaust, but with the capability of rapidly increasing the flow of hot exhaust gas in the event one or both of the CTGs are tripped. In this mode of operation, the plant is normally run as in peaking operation (dampers 13, 23, 25, 33, and 35 are open and damper 15 is closed) except that the auxiliary engine or burner 11 is operated at a low load, producing just enough hot exhaust gas to allow it to reach rated capacity quickly. When CTG 21 is tripped, damper 23 is closed and the auxiliary engine or burner brought to full load fast enough so that steam production from HRSG 26 is not interrupted. Because this would probably require rapid changes of exhaust gas flow, this design would probably require a burner with variable speed or variable volume induced draft fan to allow the exhaust flow to change rapidly.

I. System Benefits and Advantages

From the descriptions above of a preferred embodiment of this invention and operations under special conditions, a number of advantages of the system of this invention are evident:

a) Compared to a combined cycle plant utilizing an auxiliary boiler to produce steam to reduce startup emissions, a plant according to this invention would be expected to have lower capital costs. The additional costs required by the preferred embodiment of this invention, i.e., utilizing a small duct with several diverter dampers, and a small auxiliary engine or burner, would be expected to be smaller than the cost of the equipment that would no longer be required, namely: an auxiliary boiler, auxiliary boiler feedpumps, and piping connecting this boiler to the plant. Additional costs would be saved if the same auxiliary engine or burner also replaced a black start or safe shutdown generator normally required in conventional auxiliary boiler plants.

b) Fuel and water startup costs would be lower because less steam is dumped to the condenser during startup. Additional savings accrue because less steam is required to be vented during startup and less water is lost while adjusting water chemistry. Less heat duty on the condenser during startups mean less makeup to the circulating water system and less chemical consumption in this system.

c) Startups would be expected to require less operator attention and time because the plant of this invention would normally remain hot overnight. Much water chemistry work will thus be eliminated, along with the efforts involved in opening and closing vents and drip drains during startup. These factors would be expected to result in lower labor costs.

d) Emissions would be expected to be lower because the startup duration would normally be shorter, and the emissions control systems will operate effectively during startups. This factor would be expected to result in lower costs if the plant is required to buy less air emissions offsets. For a typical modern 500 MW merchant plant equipped with one steam turbine and two CTGs and HRSGs, and CO and SCR emission control catalysts, which is shut down every weekend and weeknight, annual CO emissions would be reduced at least 110,000 pounds per year, annual NOx emissions would be reduced at least 55,000 pounds, and annual VOC emissions would be reduced at least 3,000 pounds. Equipping this type of merchant plant with a system according to this invention would reduce total annual CO emissions (combined startup, shutdown, and steady-state emissions) at least 25%, with smaller but still significant reductions in NOx and VOC emissions.

e) Thermal fatigue will be reduced because thermal transitions will be reduced. One particular advantage that will occur is a reduction in the heat up rate of the high pressure drum up from ambient temperatures to boiling temperatures. This heat up rate is uncontrolled in the prior art systems, but it can be reduced with the system of this invention because much less heat is supplied to each HRSG.

f) If the combined cycle services a thermal host (i.e., supplies steam to a customer), the auxiliary engine or burner 11 could be sized to just supply enough heat to produce steam to supply the thermal host during off-peak periods. This configuration would be more efficient than a conventional combined cycle plant.

g) Net startup cost (fuel, operation and maintenance less power revenue) would be expected to be lower for the plant configurations of this invention than for a conventional power plant. One particular advantage to an operator is that if an extended startup is required to heat up a cold STG (reference numeral 63 in FIG. 1), this operation can be started during off-peak periods. CTG A 21 and CTG B 31 do not need to be started until the peak period begins, at which point the fuel costs from these machines are balanced by the higher electrical revenue. An additional advantage to this configuration is that the CTGs spend less time at low loads where they operate with low efficiencies. For a typical 500 MW merchant plant equipped with two large CTGs and one STG, annual savings are estimated at $350,000/year.

h) Operating the auxiliary engine or burner 11 overnight will reduce the cost of buying electricity for house loads. Many plants buy electricity from the grid at a higher rate than they sell it.

i) Providing a startup duct isolated with dampers at each inlet and exit, along with a separate CTG isolation damper allows each CTG to be shut down and isolated before its HRSG is connected to another source of flue gas. This prevents hot flue gas from short-circuiting through the CTG and overheating the CTG inlet or compressor.

j) Because exhaust gas from another CTG is always purging the HRSG when the HRSG is in hot standby, the purge time of a large CTG is reduced—it only has to purge the volume within the CTG and not the volume within the HRSG. This reduces the startup time, electrical consumption and thermal stress associated with purges.

k) An additional advantage of this invention is that it allows quieter operation during startups because less steam has to be dumped to a condenser (which can be loud if the condenser is air cooled).

Accordingly, it will be understood that the methods and apparatus of this invention can provide a practical method of starting up combined cycle power plants that reduces emissions, costs and fatigue damage. While the above description contains many specifics, these should not be construed as limitations on the scope of this invention, but rather as exemplifications of certain preferred embodiments for practicing this invention.

Many variations in the methods and apparatus described above are possible and will be readily apparent to one skilled in this art. For example, in an alternative embodiment of the invention, a multiple pressure HRSG could be used for one or both of HRSG A and HRSG B. A reheat steam turbine could be used with the systems of this invention. Alternative methods of deaerating the condensate water entering the HRSG could be implemented consistent with this invention. In another invention embodiment, steam generated during the startup sequence could be exported to the CTGs to provide NOx steam or steam cooling of the CTGs. In still another embodiment, the HRSG could be replaced by another heat recovery system, such as a heat recovery device that produces hot oils, water or other forms of usable energy. In yet another embodiment, a combustion turbine not used to generate electricity, i.e., to drive a compressor, could replace the CTG. The methods and apparatus of this invention can be usefully applied to new power plants as well as to retrofitted power plants.

In another embodiment, auxiliary engine or burner 11 can be replaced with another type of hot gas generator, such as with a fuel burner comprising a forced draft fan, combustor, air mixing equipment and safety equipment and instrumentation. Such a fuel burner is commercially available technology.

In another embodiment, condenser 64 and circulating water system 65 can be replaced with another type of surface condenser, such as an air-cooled condenser, which does not require a supply of cooling water.

Several of the elements of the above-described invention embodiments could, in certain alternative embodiments, be removed to reduce capital cost. For example, a steam turbine is not necessary to utilize this invention for at least some applications. In such instance, a thermal host would replace the condenser 64 and the throttle valve 62, STG 63, and circulating water system 65 would not be incorporated into the design.

Another embodiment of the invention envisions dispensing with the CO and SCR catalysts, if these catalysts are not required by permitting authorities. This invention would still be useful and represent an improvement over conventional systems because it would still reduce startup costs.

In another embodiment, one of the CTG units could be made substantially smaller than the other unit/units, e.g., one-half or less the size of the next smallest CTG unit and/or capable of generating no more than one-half, preferably no more than about 25%, of the thermal energy (in the form of hot gas) than the next smallest CTG unit. In this embodiment, the auxiliary engine or burner 11 would not be required as the smaller CTG would normally be started first and raise steam pressure in the drums before starting the other, larger CTG unit or units. In this embodiment, the auxiliary engine or burner 11, auxiliary engine exhaust duct 12, auxiliary engine startup damper 13, auxiliary engine stack damper 15, and auxiliary engine stack 16 could be dispensed with. This embodiment would even work if all of the remaining CTG units were the same size, although this would likely result in somewhat higher fuel consumption and emissions when starting the plant.

In still another embodiment, the combined cycle plant of this invention could be equipped with a fresh-air type firing system, as previously described, using either induced or forced-draft supplemental air. This system would be specifically designed to start-up the combined cycle plant while minimizing startup emissions, damage and cost. This embodiment would dispense with the startup duct 14 and auxiliary engine dampers 13 and 15 as shown in FIG. 1. For a forced-draft embodiment, one auxiliary engine or burner 11 would be supplied at the inlet of each of the HRSG startup dampers 25 and 35. An induced draft fresh-air firing system would also dispense with the auxiliary engine or burner 11, but would require an induced draft fan between each of HRSG 26 and HRSG 36 and their respective stacks 27 and 37. The HRSG would also require an internal duct burner. If supplementary air is required by the duct-burners in the HRSG, the burner could be installed between the forced draft fan supplying the supplementary air and the duct burner. This would minimize the installation costs. Alternatively, the duct-burners could be modified to operate on supplementary air only in addition to their normal operation based on supplementary air plus gas turbine exhaust.

It will be apparent to those skilled in the art that other changes and modifications may be made in the above-described apparatus and methods for combined cycle power plant operation without departing from the scope of the invention herein, and it is intended that all matter contained in the above description shall be interpreted in an illustrative and not a limiting sense.

What is claimed is:

1. In a combined cycle power plant apparatus adapted for starting up or changing the load of the plant, said apparatus comprising in combination a plurality of combustion turbines, each having at least a turbine exhaust, and systems for recovering heat, each such system having an inlet coupled to an exhaust from a combustion turbine, the improvements comprising:
   (a) an assembly for isolating said combustion turbines from said systems for recovering heat;
   (b) an auxiliary engine or other hot gas generator;
   (c) an auxiliary engine stack conveying exhaust from said auxiliary engine or other hot gas generator to the atmosphere;
   (d) an assembly for isolating said auxiliary engine or other hot gas generator from said auxiliary engine stack;
   (e) at least a startup duct system coupling exhaust from said auxiliary engine or other hot gas generator to inlets of each of said systems for recovering heat;
   (f) a first damper assembly for periodically isolating said startup duct system from each of said systems for recovering heat; and,
   (g) a second damper assembly for periodically isolating said startup duct system from said auxiliary engine or other hot gas generator.

2. In a combined cycle power plant apparatus adapted for starting up or changing the load of the plant, said apparatus comprising a plurality of combustion turbines, each having at least a turbine exhaust, and systems for recovering heat, each such system having an inlet coupled to an exhaust from a combustion turbine, the improvements comprising:
   (a) an assembly for isolating said combustion turbines from said systems for recovering heat;
   (b) at least a startup duct system connecting the inlets of all of said systems for recovering heat; and,
   (c) a first damper assembly for periodically isolating said startup duct system from each of said systems for recovering heat.

3. A method of operating a combined cycle power plant for start up, said plant comprising in combination two or more combustion turbines, each having at least a turbine exhaust, said turbines being associated with one or more systems for recovering heat, each such system having an inlet coupled to a turbine exhaust; at least an auxiliary engine or other hot gas generator and an associated auxiliary engine stack, and at least a startup duct system coupling exhaust from said auxiliary engine or other hot gas generator to inlets of each of said systems for recovering heat, said method comprising the sequential steps of:
   (a) isolating said combustion turbines from said systems for recovering heat;
   (b) isolating said auxiliary engine from said auxiliary engine stack;
   (c) connecting said auxiliary engine to said startup duct system;
   (d) connecting the startup duct system to each system for recovering heat;
   (e) starting and loading said auxiliary engine;
   (f) heating said systems for recovering heat with exhaust from said auxiliary engine by passing exhaust from the auxiliary engine through said startup duct system;
   (g) connecting said systems for recovering heat to their respective associated combustion turbines when a predetermined pressure or temperature or demand for electrical power is reached;
   (h) starting and loading one or more of said two or more combustion turbines
   (i) turning off said auxiliary engine or other hot gas generator;
   (j) starting and loading any unstarted combustion turbines; and,
   (k) isolating said systems for recovering heat from said startup duct system.

4. A method of operating a combined cycle power plant for start up, said plant comprising in combination two or more combustion turbines, each having at least a turbine exhaust, said turbines being associated with one or more systems for recovering heat, each such system having an inlet coupled to a turbine exhaust; at least an auxiliary engine or other hot gas generator and an associated auxiliary engine stack, and at least a startup duct system coupling exhaust from said auxiliary engine or other hot gas generator to inlets of each of said systems for recovering heat, said method comprising the sequential steps of:
   (a) isolating all combustion turbines from said systems for recovering heat except for a lead combustion turbine;
   (b) connecting the inlets of all systems for recovering heat to said startup duct system;
   (c) starting and loading the lead combustion turbine;
   (d) heating said systems for recovering heat with exhaust from the lead combustion turbine by passing exhaust from said lead combustion turbine through the startup duct system or directly to the systems for recovering heat;
   (e) connecting remaining combustion turbines to said associated systems for recovering heat when a predetermined pressure or temperature or electrical demand is reached, except for that system for recovering heat which is directly connected to the lead combustion turbine;
   (f) starting and loading remaining combustion turbines; and,
   (g) isolating the inlets of all systems for recovering heat from said startup duct system.

5. A method of operating a combined cycle plant following start up according to either of claims 3 or 4 for subsequently quickly cooling down the systems for recovering heat, said method comprising the additional steps of:
   (a) turning off all combustion turbines and isolating them;
   (b) connecting the inlets of all systems for recovering heat to the startup duct system;
   (c) connecting the auxiliary engine or other hot gas generator to the startup duct system;
   (d) starting the auxiliary engine or other hot gas generator and operating it to produce low temperature exhaust; and,
   (e) operating the auxiliary engine or other hot gas generator until the cool exhaust has cooled the systems for recovering heat.

6. A method of operating a combined cycle plant following start up according to either of claims 3 or 4 for subsequently maintaining the plant in hot standby, said method comprising the additional steps of:
   (a) turning off a plurality of combustion turbines while keeping at least one operating;
   (b) isolating the turned off combustion turbines;
   (c) connecting all systems for recovering heat to the startup duct system; and,
   (d) maintaining a predetermined temperature in those systems for recovering heat which are connected to the turned-off combustion turbines with exhaust from the operating turbines by passing the exhaust through the startup duct system.

7. A method of operating a combined cycle plant following start up according to either of claims 3 or 4 for subsequently maintaining the plant in hot standby, said method comprising the additional steps of:
(a) turning off at least some of the combustion turbines;
(b) isolating the turned off combustion turbines;
(c) connecting all systems for recovering heat to the startup duct system;
(d) connecting the auxiliary engine or other hot gas generator to the startup duct system;
(e) starting and loading the auxiliary engine or other hot gas generator; and,
(f) maintaining a predetermined temperature in those systems for recovering heat which are connected to the turned-off combustion turbines with exhaust from the auxiliary engine or other hot gas generator by passing the exhaust through the startup duct system.

8. A method according to claim 7 wherein the auxiliary engine or other hot gas generator is connected to the startup duct system and started before turning off the combustion turbines.

9. A combined cycle power plant assembly comprising in combination:
(a) at least a combustion turbine unit comprising a turbine unit exhaust;
(b) a heat recovery system connected to a combustion turbine unit, said heat recovery system comprising a heat recovery system inlet fluidically coupled to the turbine unit exhaust;
(c) a hot gas source unit capable of generating not more than a limited amount of heat in the form of hot gas exhaust, which limited amount of heat is substantially less than the amount of heat in the form of hot gas produced under normal operating conditions by the combustion turbine unit, said hot gas source unit comprising a hot gas exhaust outlet fluidically coupled both to a heat recovery system inlet and to a vent;
(d) a duct system comprising duct portions connecting the hot gas exhaust outlet to a heat recovery system inlet and directly to a vent without passing through a heat recovery system, and also duct portions connecting each turbine unit exhaust to a heat recovery system inlet; and,
(e) a fluid flow control system associated with said duct system comprising separate fluid flow control devices in each of the following duct portions of said duct system: (i) in each first duct portion connecting the hot gas exhaust outlet to a heat recovery system inlet; (ii) in a second duct portion directly connecting the hot gas exhaust outlet to a vent without passing through a heat recovery system; and (iii) in each third duct portion connecting a turbine unit exhaust to a heat recovery system inlet.

10. A combined cycle power plant assembly according to claim 9 wherein said hot gas source unit is selected from the group consisting of small gas turbines, small diesel generators, and small burner units.

11. A combined cycle power plant assembly according to claim 9 wherein said hot gas source unit is sized to produce not more than a limited amount of heat primarily in the form of hot gas exhaust that is about 1% to about 15% of the heat produced under normal operating conditions by the combustion turbine unit.

12. A combined cycle power plant assembly according to claim 9 wherein said hot gas source unit is sized to produce not more than a limited amount of heat primarily in the form of hot gas exhaust that is less than about 10% of the heat produced under normal operating conditions by the combustion turbine unit.

13. A combined cycle power plant assembly according to claim 9 wherein said fluid flow control devices are damper elements.

14. A combined cycle power plant assembly according to claim 9 wherein said fluid flow control devices are selected from the group consisting of guillotine, spectacle, louver, sickle, butterfly or flap-type dampers.

15. A combined cycle power plant assembly according to claim 9 wherein said heat recovery system comprises in combination a diffuser, a superheater, an evaporator, a carbon monoxide catalyst, a selective reduction catalyst, an economizer, a feedwater pump, a preheater, and a vent stack.

16. A combined cycle power plant assembly according to claim 9 wherein said heat recovery system comprises a carbon monoxide catalyst, a selective reduction catalyst, or both.

17. A combined cycle power plant assembly according to any of claims 9–16 wherein at least two combustion turbine units, each comprising a turbine unit exhaust, are connected respectively to at least two associated heat recovery systems, each comprising a heat recovery system inlet fluidically coupled to at least two of the combustion turbine unit exhausts.

18. A combined cycle power plant assembly according to claim 17 wherein said duct system further comprises duet portions connecting the hot gas exhaust outlet to each of the heat recovery system inlets.

19. A combined cycle power plant assembly according to claim 18 wherein said fluid flow control system comprises a separate fluid flow control device in each of the duct portions of said duct system connecting the hot gas exhaust outlet to each of the heat recovery system inlets and also in each of the duct portions connecting a turbine unit exhaust to an associated heat recovery system inlet.

20. A combined cycle power plant assembly according to any of claims 9–16 wherein at least three combustion turbine units, each comprising a turbine unit exhaust, are connected respectively to at least two associated heat recovery systems, each comprising a heat recovery system inlet fluidically coupled to at least two of the combustion turbine unit exhausts.

21. A combined cycle power plant assembly according to any of claims 9–16 further comprising an automated control system for controlling the fluid flow control system responsive to signals from position switches associated with the fluid flow control devices.

22. A combined cycle power plant assembly according to claim 9 further wherein each of said fluid flow control devices comprises a duct portion flap-type damper which, when at least partly open, permits fluid flow in either direction through said flap-type damper or, alternatively, when closed substantially prevents fluid flow in either direction through the flap-type damper.

23. A combined cycle power plant assembly according to claim 9 wherein each first duct portion connecting the hot gas exhaust outlet to a heat recovery system inlet comprises at least two separate fluid flow control devices along a flow path between the hot gas exhaust outlet and a heat recovery system inlet.

24. A combined cycle power plant assembly according to claim 9 comprising at least two combustion turbine units, each comprising a turbine unit exhaust fluidically coupled to a heat recovery system inlet of an associated heat recovery system, further wherein the hot gas exhaust outlet of said hot gas source unit is fluidically coupled to each of the heat recovery system inlets by respective first duct portions containing fluid flow control devices.

25. A combined cycle power plant assembly according to claim 24 wherein each first duct portion connecting the hot gas exhaust outlet to a heat recovery system inlet comprises at least two separate fluid flow control devices along a flow path between the hot gas exhaust outlet and a heat recovery system inlet.

26. A combined cycle power plant assembly according to claim 9 wherein said assembly is an open combined cycle power plant assembly wherein substantially none of the exhaust from a heat recovery system is returned to a combustion turbine unit.

27. A method of operating a combined cycle power plant for start up, said plant comprising in combination a combustion turbine having a turbine exhaust, said turbine being associated with a system for recovering heat, such system having an inlet coupled to said turbine exhaust; at least an auxiliary engine or other hot gas generator connected directly to an associated auxiliary engine stack without passing through said system for recovering heat, and at least a startup duct system coupling exhaust from said auxiliary engine or other hot gas generator to said inlet of said system for recovering heat, said method comprising the sequential steps of:
 (a) isolating said combustion turbine from said system for recovering heat and isolating said auxiliary engine from said auxiliary engine stack;
 (b) connecting said auxiliary engine to said startup duct system and connecting the startup duct system to the system for recovering heat;
 (c) starting and loading said auxiliary engine;
 (d) heating said system for recovering heat with exhaust from said auxiliary engine by
   passing exhaust from the auxiliary engine through said startup duct system;
 (e) connecting said system for recovering heat to the associated combustion turbine
   when a predetermined pressure or temperature or demand for electricity is reached;
 (f) starting and loading the combustion turbine;
 (g) turning off said auxiliary engine or other hot gas generator; and,
 (h) isolating said system for recovering heat from said startup duct system.

28. A method of operating a combined cycle plant following start up according to claim 27 for subsequently quickly cooling down the system for recovering heat, said method comprising the additional steps of:
 (a) turning off the combustion turbine and isolating it;
 (b) connecting the inlet of the system for recovering heat to the startup duct system;
 (c) connecting the auxiliary engine or other hot gas generator to the startup duct system;
 (d) starting the auxiliary engine or other hot gas generator and operating it to produce low temperature exhaust; and,
 (e) operating the auxiliary engine or other hot gas generator until the cool exhaust has cooled the system for recovering heat.

* * * * *